United States Patent
Okui et al.

(10) Patent No.: US 7,166,931 B2
(45) Date of Patent: Jan. 23, 2007

(54) UNINTERRUPTIBLE POWER SUPPLY APPARATUS

(75) Inventors: Yoshiaki Okui, Ueda (JP); Shouichi Oota, Ueda (JP); Naoya Nakamura, Ueda (JP)

(73) Assignee: Sanyo Denki Co., Ltd., Tokyo (JP)

( * ) Notice: Subject to any disclaimer, the term of this patent is extended or adjusted under 35 U.S.C. 154(b) by 48 days.

(21) Appl. No.: 10/954,073

(22) Filed: Sep. 30, 2004

(65) Prior Publication Data

US 2005/0094339 A1    May 5, 2005

(30) Foreign Application Priority Data

Oct. 30, 2003    (JP)    ............................ 2003-370288

(51) Int. Cl.
    *H02J 7/00*    (2006.01)
(52) U.S. Cl. ....................................... 307/66
(58) Field of Classification Search ................. 307/66, 307/64, 43, 80, 87; 363/34, 37; 320/138
    See application file for complete search history.

(56) References Cited

U.S. PATENT DOCUMENTS 5,315,533 A * 5/1994 Stich et al. ................ 700/298

6,768,223 B1 * 7/2004 Powell et al. .................. 307/64

FOREIGN PATENT DOCUMENTS

| JP | 05-260684 | 10/1993 |
|----|-----------|---------|
| JP | 2000139040 | * 5/2000 |

* cited by examiner

*Primary Examiner*—Pia Tibbits
(74) *Attorney, Agent, or Firm*—Antonelli, Terry, Stout and Kraus, LLP.

(57) ABSTRACT

The uninterruptible power supply apparatus comprises an AC switch for turning on/off the AC power that is input from a commercial AC power source; a storage battery; a power conversion device; a load device connected to the output end of the AC switch; an output AC voltage detection unit for detecting an output AC voltage that is output from the AC switch; and an abnormality detection circuit for detecting that the detected output AC voltage is outside predefined upper and lower limits; wherein said AC switch turns off in accordance with a signal detected by said abnormality detection circuit. Further comprises a restoration circuit for generating a restoration signal when the AC voltage detected by an input AC voltage detection unit exceeds at least a lower-limit AC voltage setting that is increased gradually or continuously in accordance with a load factor computed by a load factor computation circuit.

5 Claims, 4 Drawing Sheets

UNINTERRUPTIBLE POWER SUPPLY APPARATUS

BACKGROUND OF THE INVENTION

1. Field of the Invention

The present invention relates to an uninterruptible power supply apparatus for constant commercial power supply, which supplies power via an AC switch while a commercial power source is normal, and turns off the AC switch, in the event of a power failure in the commercial power source, operates a power conversion device to convert DC power, which is stored beforehand in a storage battery, to AC power, and supplies the AC power to a load.

2. Description of Related Art

A conventionally known uninterruptible power supply apparatus is disclosed, for instance, by Japanese Patent Laid-Open No. 260684/1993 (Patent Document 1). Patent Document 1 describes a CATV (cable television) uninterruptible power supply apparatus, which comprises a direct power supply circuit for receiving commercial AC power from its source and outputting AC power for constant power supply to a load; a commercial power input abnormality detection circuit for detecting an abnormality in the received commercial AC power; and an inverter circuit for outputting AC power for power supply from a battery to a load immediately upon receipt of a commercial power input abnormality detection signal, which is generated by the commercial power input abnormality detection circuit when it detects an abnormality in the commercial AC power. The commercial power input abnormality detection circuit comprises a first detector, which outputs a commercial power input abnormality detection signal when the voltage of the received commercial AC power is lower than specified, and a second detector, which outputs a commercial power input abnormality detection signal when the voltage of the received commercial AC power is higher than specified.

If the uninterruptible power supply apparatus described in Patent Document 1, which supplies power mainly from a commercial power source, detects abnormalities by a conventional method for input voltage detection, a problem indicated in FIG. 4 arises. In FIG. 4, the vertical axis represents detection voltage settings and actual output voltages from an AC switch, whereas the horizontal axis represents a load factor. When the load factor is low, the requirements specifications for the load are complied with because an insignificant voltage drop is invoked by an impedance exhibited by the wiring to the power-receiving end of the apparatus and an AC switch within the apparatus. However, if the load factor is high, there are some cases where the requirements specifications for the load are not complied with.

Conventionally, AC switch restoration control has been exercised in accordance with the root mean square value of an AC voltage that is input from a commercial power source to the AC switch. Therefore, when the load is close to 100% and the hysteresis width is not adequate for lower-limit detection as indicated in FIG. 4 because the output voltage is decreased by a specified amount of voltage from the input voltage due to the impedance of the input wiring for the AC switch, detection chattering occurs.

Immediately before restoration, the uninterruptible power supply apparatus supplies power from a battery to the load via an inverter. It means that the load is not connected to the input voltage (commercial power source). When restoration is achieved by a conventional detection method that uses the input voltage only, the prevalent load factor is not known. Therefore, it is impossible to determine the degree of a voltage drop that is to be caused by the above-mentioned impedance. Consequently, the restoration voltage detection value has to be set in terms of a maximum load factor. As a result, if the restoration voltage is set in compliance with the load specifications, the input voltage variation range narrows, giving rise to a problem.

SUMMARY OF THE INVENTION

An object of the present invention is to provide an uninterruptible power supply apparatus that enlarges the input variation range and prevents voltage abnormality detections from being readily achieved and the AC switch from frequently turning off to invoke a power failure during a normal operation while complying with the requirements specifications for the load to solve the above problems.

Another object of the present invention is to provide an uninterruptible power supply apparatus that does not incur chattering irrespective of the load factor when the AC switch is restored to normal.

In one aspect, the present invention, which achieves the above objects, is an uninterruptible power supply apparatus that comprises an AC switch for turning on/off the AC power that is input from a commercial power source; a storage battery; a power conversion device installed between the AC switch and the storage battery; a load device connected to the output end of the AC switch; an output AC voltage detection unit for detecting an output AC voltage that is output from the AC switch; and an abnormality detection circuit for detecting that the output AC voltage detected by the output AC voltage detection unit is outside predefined upper and lower limits. The AC switch turns off in accordance with a signal detected by the abnormality detection circuit.

In another aspect, the present invention is an uninterruptible power supply apparatus that comprises an input AC voltage detection unit for detecting an input AC voltage that is input to an AC switch; a load current measurement unit for measuring the load current of a load device; a load factor computation circuit for computing a load factor in accordance with the load current measured by the load current measurement unit; and a restoration circuit for generating a restoration signal when the AC voltage detected by the input AC voltage detection unit exceeds at least a lower-limit AC voltage setting that is shifted (increased) gradually or continuously in accordance with an increase in the load factor computed by the load factor computation circuit. The AC switch turns on to achieve restoration in accordance with the restoration signal generated by the restoration circuit.

In still another aspect, the present invention is an uninterruptible power supply apparatus that comprises an input AC voltage detection unit for detecting an input AC voltage that is input to an AC switch; a load current measurement unit for measuring the load current of a load device; a load factor computation circuit for computing a load factor in accordance with the load current measured by the load current measurement unit; and a restoration circuit for generating a restoration signal when the AC voltage detected by the input AC voltage detection unit is between upper- and lower-limit AC voltage settings that are shifted (increased) gradually or continuously in accordance with an increase in the load factor computed by the load factor computation circuit. The AC switch turns on to achieve restoration in accordance with the restoration signal generated by the restoration circuit.

As described above, the present invention makes it possible to enlarge the input variation range and prevent voltage abnormality detections from being readily achieved and the AC switch from frequently turning off to invoke a power failure during a normal operation while complying with the requirements specifications for the load.

Further, the present invention also makes it possible to avoid chattering because the voltage prevalent after AC switch restoration is within a permissible range.

DETAILED DESCRIPTION OF THE PREFERRED EMBODIMENTS

Embodiments of the present invention will now be described with reference to the accompanying drawings.

Figure 1:
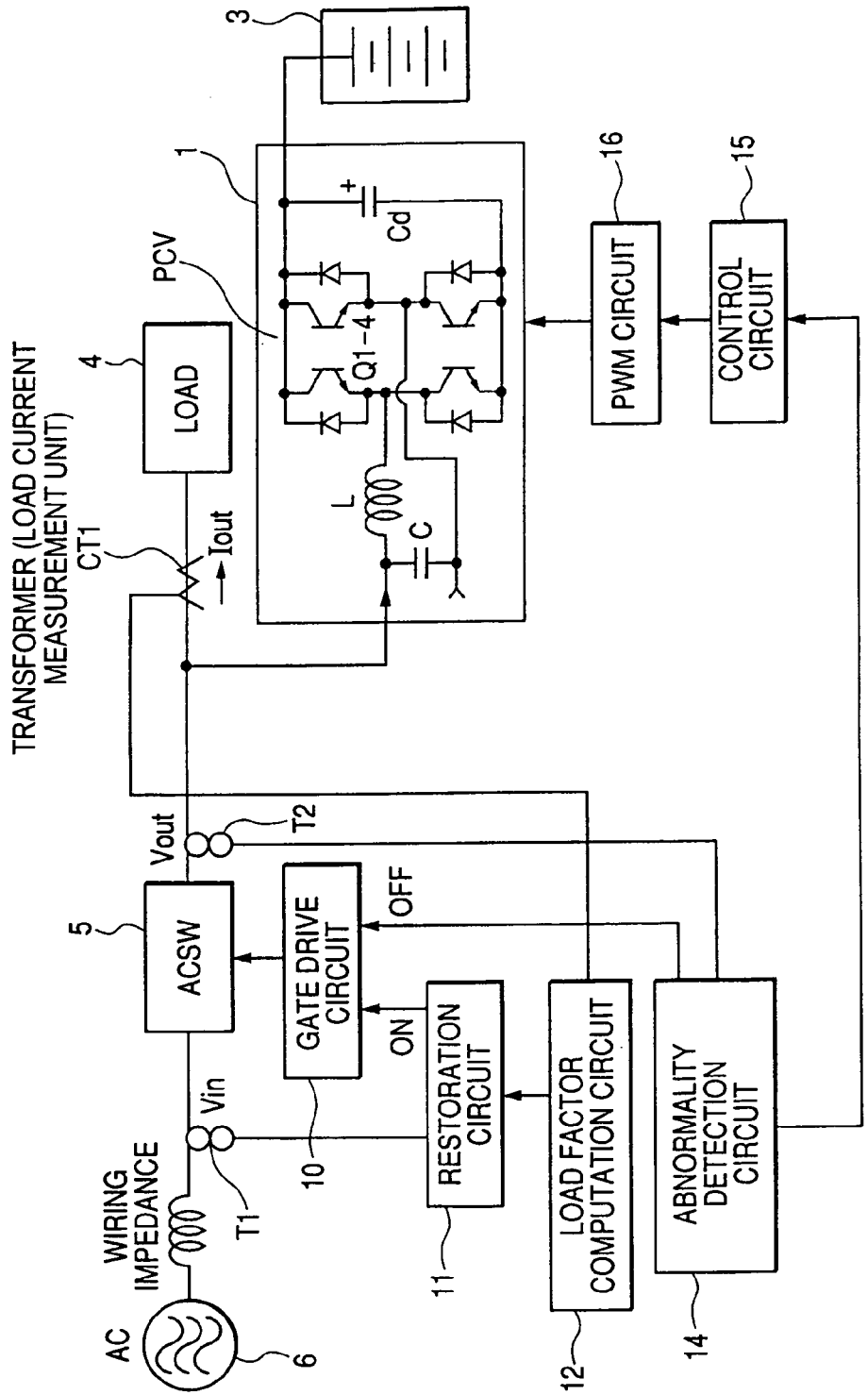
FIG. 1 illustrates the configuration of one embodiment of an uninterruptible power supply apparatus according to the present invention.

FIG. 1 schematically shows the configuration of one embodiment of an uninterruptible power supply apparatus according to the present invention. Although a commercial AC power source 6 provides a three-phase alternating current, the wiring and control system illustrations in FIG. 1 relate to a single phase, that is, only one phase. As indicated in FIG. 1, the uninterruptible power supply apparatus comprises an AC switch (ACSW) 5, a power conversion device (inverter) 1, a storage battery 3, and a load device (load) 4. The AC switch (ACSW) 5, which is positioned between the commercial AC power source 6 and power conversion device (inverter) 1, corresponds to one phase and comprises two back-to-back connected thyristors, which are designated Th1 and Th2 (not shown). While the commercial AC power source is in a normal state (including a restoration state), the commercial AC power source 6 supplies AC power to the load device 4 via the AC switch (ACSW) 5. The AC switch (ACSW) 5 turns on to supply AC power from the commercial AC power source 6 to the load device 4 while the commercial AC power source is in a normal state, and turns off to shut off the AC power supply from the commercial AC power source 6 when the commercial AC power source 6 goes into a power failure state. If an abnormality occurs in the commercial AC power source 6, the AC switch (ACSW) 5 turns off in the same manner as in the power failure state to shut off the AC power supply from the commercial AC power source 6. As described later, a power failure and other abnormalities in the commercial AC power source 6 are detected by a detection circuit 14, which detects the output AC voltage (Vout) of the AC switch (ACSW) 5.

While the commercial AC power source 6 is normal, the power conversion device (inverter) 1 not only performs a power rectification operation by receiving AC power from the commercial AC power source 6 and converting it to DC power to charge the storage battery 3, but also performs an active filtering operation by invoking an electrical current flow to compensate for a harmonic current and reactive current, which flow to the load device 4. The power conversion device (inverter) 1 also performs an inverse transform operation in which the storage battery 3 is used, mainly while a power failure detection circuit 14 is detecting a power failure or other abnormality, to convert DC power to AC power under the control of a PWM circuit 16 and supply AC power to the load device 4. The power conversion device 1 includes a reactor L, which is series connected between an AC terminal section and an AC terminal of a power converter PCV, and a capacitor Cd, which is provided for a DC terminal of the power converter PCV.

Instrument transformer (AC voltage detection unit) T1 is installed in an input AC line to the AC switch (ACSW) 5 in order to detect an AC voltage (Vin) that is supplied from the commercial AC power source 6. Further, instrument transformer (AC voltage detection unit) T2 is installed in an output AC line to the AC switch (ACSW) 5 (an input AC line to the power conversion device 1) in order to detect an AC voltage (Vout) in the AC line. Furthermore, current transformer (load current measurement unit) CT1 is installed in an AC line for supplying AC power to the load device 4 for the purpose of measuring a load current (Iout) that flows to the load device 4.

One embodiment in which the AC switch (ACSW) 5 turns off and the power conversion device 1 supplies AC power to the load device 4 when the voltage input to the AC switch 5 is abnormal (or in a power failure state) will now be described. The abnormality detection circuit 14 detects an abnormality (or a power failure) in a voltage input to the AC switch 5. More specifically, the abnormality detection circuit 14 checks whether the output AC voltage (Vout) detected by AC instrument transformer T2, which is provided for the output end of the AC switch 5, is within a permissible voltage range, which is defined by upper- and lower-limit detection values, and generates an OFF signal to indicate that the detected voltage is outside the permissible voltage range. When the OFF signal is applied from the abnormality detection circuit 14, a gate drive circuit 10 closes thyristors Th1 and Th2 to shut off the AC power supply from the commercial AC power source. As described above, the employed configuration is such that the abnormality detection circuit 14 uses the output AC voltage (Vout) to detect an abnormality (or a power failure) in the voltage input to the AC switch 5. This ensures that the impedance exhibited by the wiring to the power-receiving end of the apparatus and the AC switch within the apparatus is taken into account. Therefore, it is possible to enlarge the input variation range and prevent voltage abnormality detections from being readily achieved to invoke a power failure during a normal operation while complying with the requirements specifications for the load. At the same time, a control circuit 15 issues a control voltage command to the PWM circuit 16 in accordance with a signal indicating a power failure or other abnormality, which is applied from the abnormality detection circuit 14. The PWM circuit 16 converts DC power to AC power by exercising control in compliance with the control voltage command. The power conversion device 1 then supplies AC power to the load device 4.

Figure 2:
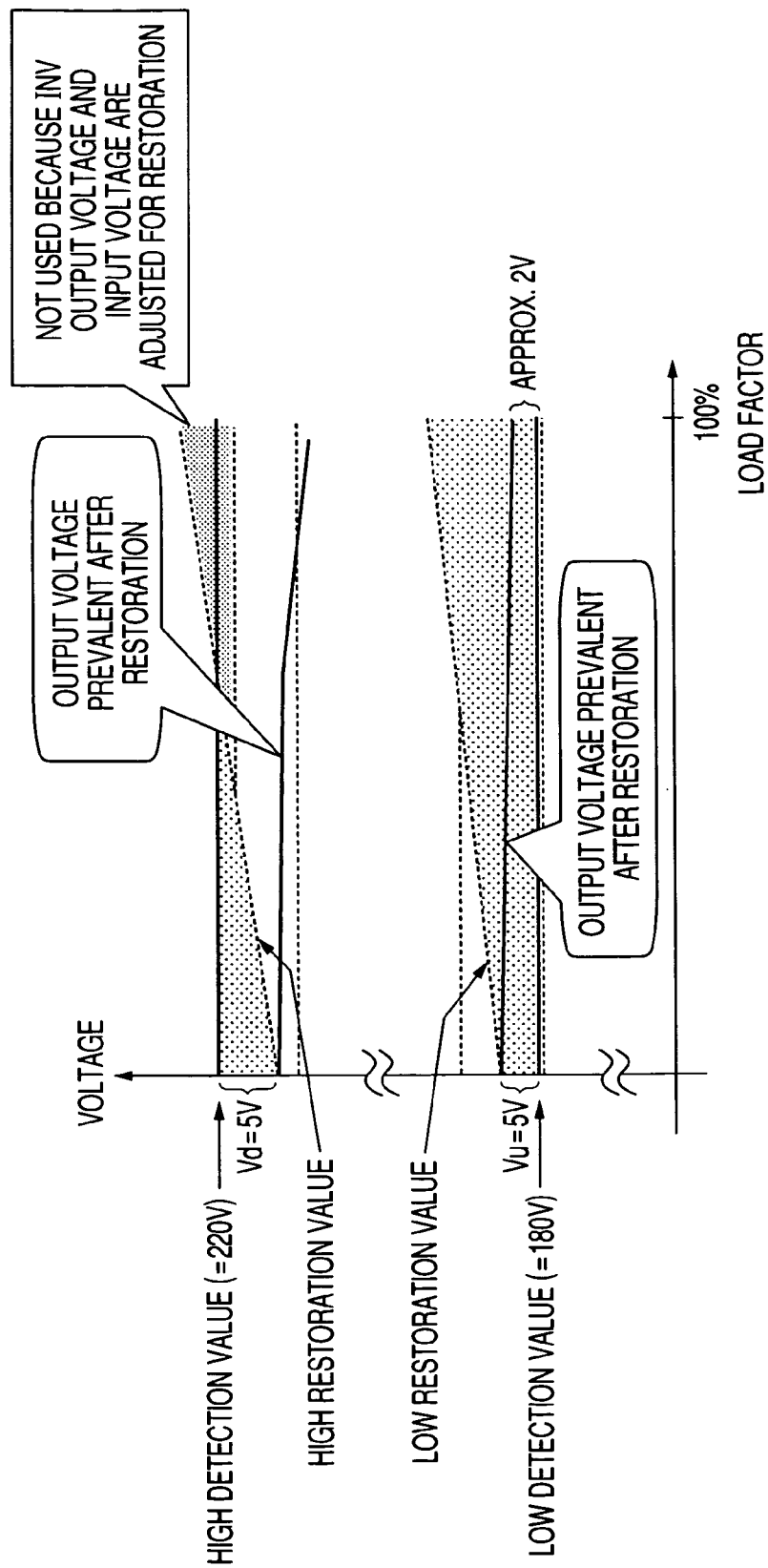
FIG. 2 illustrates the relationship among a load factor, upper-limit (high) restoration value, lower-limit (low) restoration value, upper-limit (high) detection value, and lower-limit (low) detection value in a case where AC switch restoration control according to the present invention is continuously exercised in accordance with the load factor.

Another embodiment in which the AC switch (ACSW) 5 is restored to normal after input voltage normalization will now be described. A load factor computation circuit 12 computes a load factor. More specifically, it calculates the power required for the load side (this power is referred to as the "load factor" with reference to the apparatus rating) in accordance with the load current (Iout) measured by current transformer CT1. A restoration circuit 11 generates a restoration signal as an ON signal when the input AC voltage (Vin) detected by instrument transformer T1 is between upper-limit (high) and lower-limit (low) restoration AC voltage settings (restoration settings). The upper-limit (high) and lower-limit (low) restoration AC voltage settings (restoration settings) are determined by shifting (increasing) the hysteresis for the input AC voltage (Vin) (detected value) detected by instrument transformer T1, which is installed at the input end of the AC switch 5, in accordance with the load factor computed by the load factor computation circuit 12. In the restoration circuit 11, however, a restoration AC voltage value (restoration value) is set for the upper limit to ensure that the upper-limit detection value is within the permissible range as indicated in FIG. 2. At the time of restoration, the storage battery 3 supplies power to the load via the power conversion device 1. When restoration is to be accomplished, the AC switch (ACSW) 5 is turned on to achieve normalization with the input voltage phase adjusted for the voltage value. Therefore, all the requirements specifications for the load are not complied with. Consequently, the upper-limit voltage is not used for restoration. As a result, it is possible to avoid chattering on the upper-limit side. When the restoration circuit 11 applies the ON signal as the restoration signal, the gate drive circuit 10 operates thyristors Th1 and Th2 so that the commercial AC power source 6 supplies AC power, which is within the permissible voltage range (e.g., 200 V±10% (180 V to 220 V)), to the load device 4 to achieve restoration. The values defining the permissible voltage range are the settings for the abnormality detection circuit 14, which detects an AC output voltage (lower-limit value: 180 V; upper-limit value: 220 V).

Further details will now be given. FIG. 2 illustrates a case where the restoration voltage set by the restoration circuit 11 linearly (continuously) shifts (increases) in accordance with the load factor. The restoration circuit 11 is set so that the lower-limit setting gradually increases with an increase in the load factor after the lower-limit (low) restoration value is raised by a predetermined voltage value (Vu) in relation to the lower-limit (low) detection value, which is detected by instrument transformer T1 installed at the input end of the AC switch 5. As a result, the voltage output from the AC switch (ACSW) 5 after restoration is the actual lower-limit restoration voltage in relation to the lower-limit (low) detection value detected by instrument transformer T1. Further, the restoration circuit 11 is set so that the upper-limit setting gradually increases with an increase in the load factor, as is the case with the lower-limit, after the upper-limit (high) restoration value is lowered by a predetermined voltage value (Vd) in relation to the upper-limit (high) detection value, which is detected by instrument transformer T1. As described earlier, however, the upper-limit (high) restoration value is set so that the upper limit of the permissible range is not exceeded. As a result, the voltage output from the AC switch (ACSW) 5 after restoration is the actual upper-limit restoration voltage in relation to the upper-limit (high) detection value detected by instrument transformer T1. The hysteresis values (Vd and Vu) are approximately 5 V.

Figure 3:
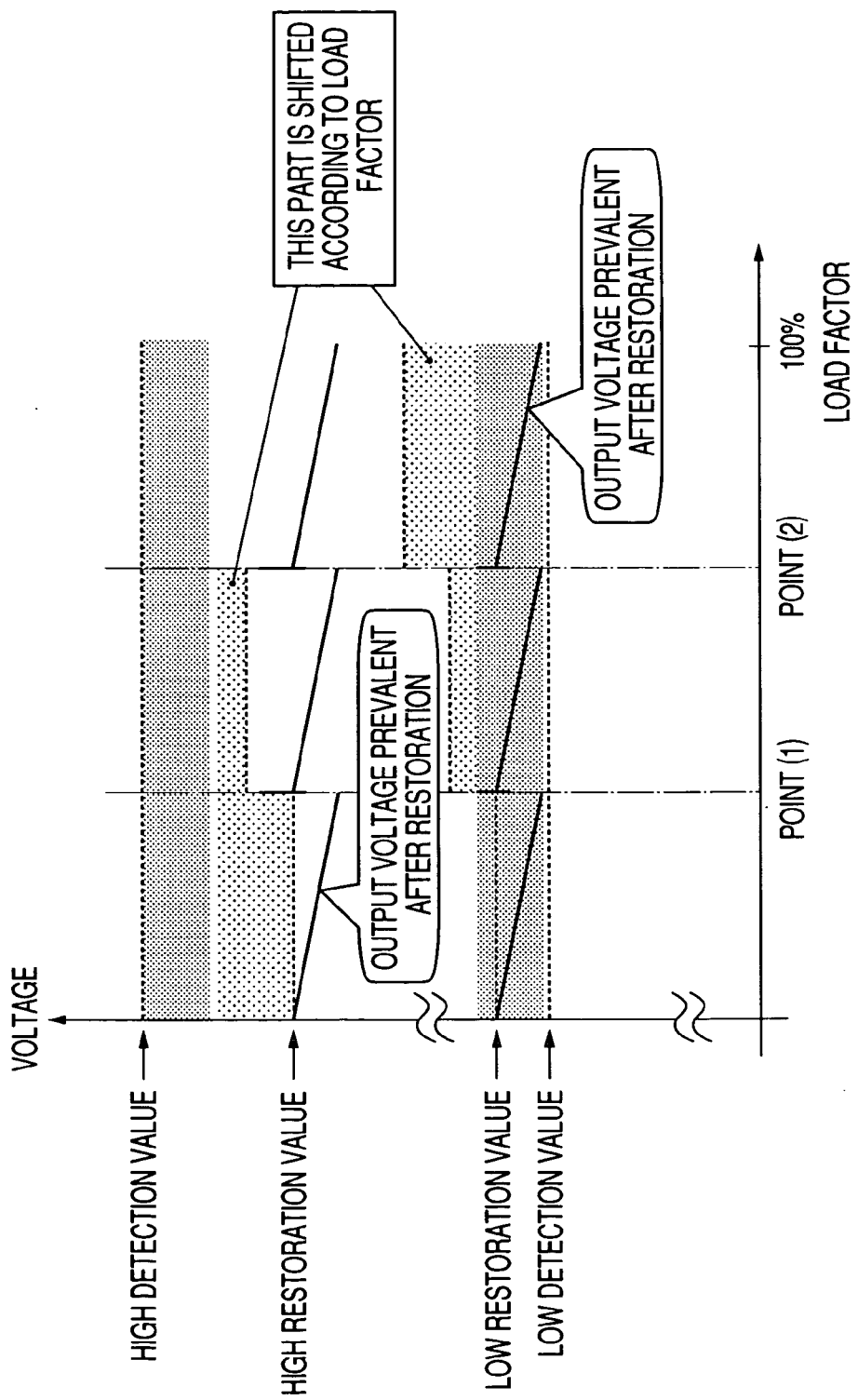
FIG. 3 illustrates the relationship among a load factor, upper-limit (high) restoration value, lower-limit (low) restoration value, upper-limit (high) detection value, and lower-limit (low) detection value in a case where AC switch restoration control according to the present invention is gradually exercised in accordance with the load factor.
Figure 4:
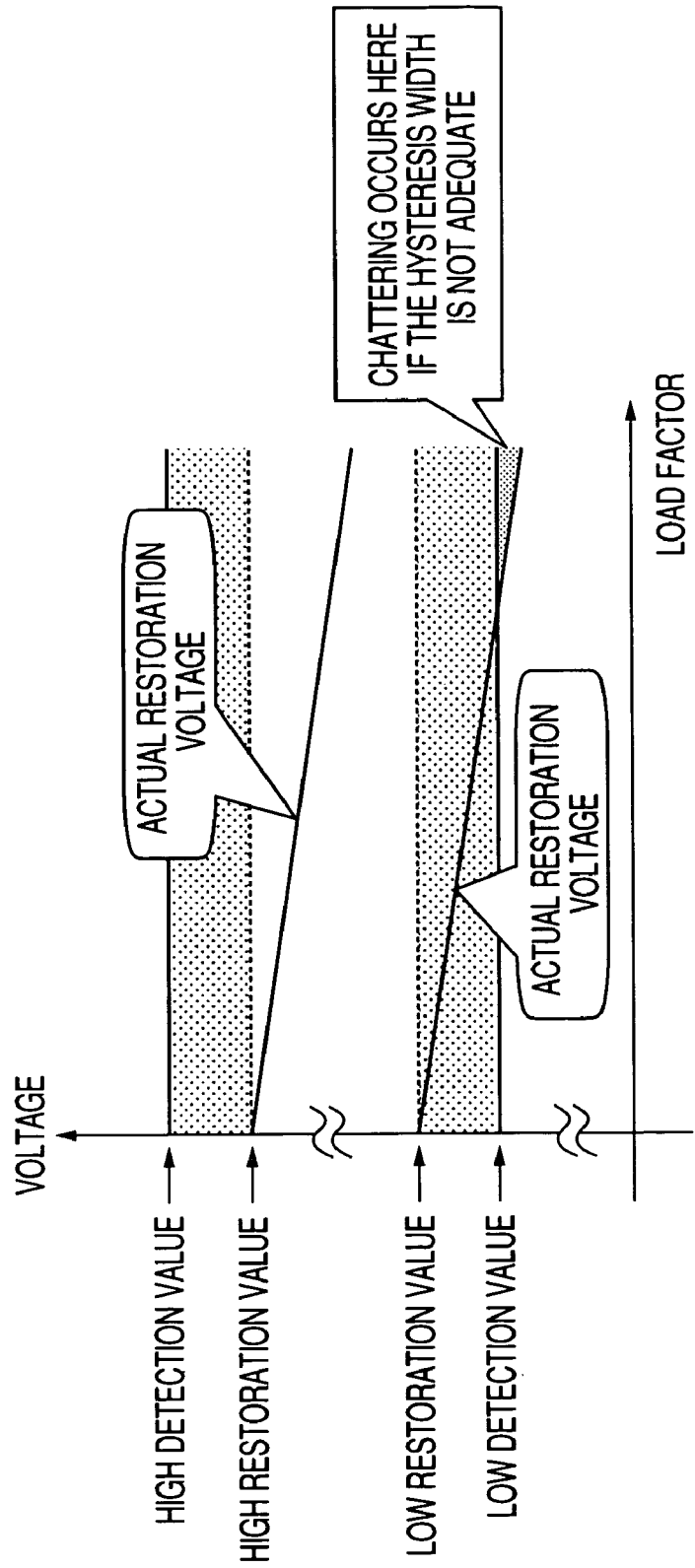
FIG. 4 illustrates the relationship among a load factor, upper-limit (high) restoration value, lower-limit (low) restoration value, upper-limit (high) detection value, and lower-limit (low) detection value in a case where AC switch restoration control is exercised in a conventional manner.

FIG. 3 illustrates a case where the restoration voltage set by the restoration circuit 11 gradually shifts (increases) in accordance with the load factor. The restoration circuit 11 is set so that the lower-limit setting gradually increases with an increase in the load factor after the lower-limit (low) restoration value is raised by a predetermined voltage value in relation to the lower-limit (low) detection value, which is detected by instrument transformer T1 installed at the input end of the AC switch 5. FIG. 3 indicates that such a gradual increase occurs at points (1) and (2). As a result, the voltage output from the AC switch (ACSW) 5 after restoration is the actual lower-limit saw-toothed restoration voltage in relation to the lower-limit (low) detection value detected by instrument transformer T1. Further, the restoration circuit 11 is set so that the upper-limit setting gradually increases with an increase in the load factor, as is the case with the lower-limit, after the upper-limit (high) restoration value is lowered by a predetermined voltage value in relation to the upper-limit (high) detection value, which is detected by instrument transformer T1. FIG. 3 indicates that such a gradual increase occurs at points (1) and (2). As a result, the voltage output from the AC switch (ACSW) 5 after restoration is the actual upper-limit saw-toothed restoration voltage in relation to the upper-limit (high) detection value detected by instrument transformer T1. As described above, software processing can be performed to gradually increase the upper- and lower-limit restoration value settings with an increase in the load.

As described above, setup is performed so that when the AC switch is to be restored to normal after input voltage normalization, the upper- and lower-limit restoration values increase continuously or gradually with an increase in the load factor in relation to the upper- and lower-limit detection values, which are detected by instrument transformer T1 installed at the input end of the AC switch. Therefore, it is possible to avoid chattering, which may occur when the voltage is lowered by the amount of impedance, while complying with the specifications for the load side.

The foregoing embodiments are configured so that the output end of the AC switch achieves abnormality detection when the AC switch turns off. Therefore, the requirements specifications for the load side can be properly complied with.

Further, the foregoing embodiments consider the load factor when they perform restoration value setup for AC switch restoration. Therefore, the voltage prevalent after restoration is within the permissible range. As a result, it is possible to avoid chattering.

Furthermore, the foregoing embodiments consider the load factor when they perform restoration value setup for AC switch restoration. As a result, it is possible to enlarge the input voltage variation range.

Consequently, the foregoing embodiments make it possible to prevent a power failure from frequently occurring in an uninterruptible power supply apparatus for constant commercial power supply.

What is claimed is:

1. An uninterruptible power supply apparatus including an AC switch which turns on/off the AC power that is input from a commercial power source, a storage battery, a power conversion device installed between the AC switch and the storage battery, and a load device of AC power coupled to the output end of the AC switch, said apparatus comprising:

an output AC voltage detection unit which is provided on an output side of the AC switch and detects an output AC voltage that is output from the AC switch;

an abnormality detection circuit which detects an abnormal signal when the output AC voltage detected by said output AC voltage detection unit becomes outside predefined upper and lower limits of detection AC voltage values;

a control circuit which generates a control voltage command based on the abnormal signal detected by the abnormality detection circuit;

a PWM circuit which controls the power conversion device based on the control voltage command generated by the control circuit;

an input AC voltage detection unit which is provided on an input side of the AC switch and detects an input AC voltage (Vin) that is input from the commercial power source; and a restoration circuit which restores the AC switch by outputting a restoration signal when the input AC voltage detected by the input AC voltage detection unit comes within a range of predefined upper and lower limits of restoration AC voltage values, wherein said AC switch turns off in accordance with the abnormal signal detected by the abnormality detection circuit and DC power of the storage battery inverse transforms into AC power by controlling the power conversion device with the PWM circuit in accordance with giving the control voltage command issued from the control circuit based on the abnormal signal to the PWM circuit so that the AC power inverse transformed from the DC power of the storage battery with the power conversion device is supplied to the load device of AC power, and wherein when the input AC voltage detected by the input AC voltage detection unit comes within the range of predefined upper and lower limits of restoration AC voltage values, the AC switch is restored on the basis of the restoration signal output from the restoration circuit.

2. The uninterruptible power supply apparatus according to claim 1, further comprising:

a load current measurement unit which measures a load current that flows to the load device of AC power; and a load factor computation circuit which computes a load factor in accordance with the load current measured by the load current measurement unit;

wherein in the restoration circuit, at least the lower-limit of the restoration AC voltage is predefined so as to increase gradually in accordance with an increase in the load factor computed by the load factor computation circuit and when the input AC voltage detected by the input AC voltage detection unit exceeds at least the predefined lower limit of restoration AC voltage value, the AC switch is restored on the basis of the restoration signal output from the restoration circuit.

3. The uninterruptible power supply apparatus according to claim 1, further comprising:

a load current measurement unit which measures a load current that flows to the load device of AC power; and a load factor computation circuit which computes a load factor in accordance with the load current measured by the load current measurement unit;

wherein in the restoration circuit, at least the lower limit of the restoration AC voltage value is predefined so as to increase continuously in accordance with an increase in the load factor computed by the load factor computation circuit, and when the input AC voltage detected by the input AC voltage detection unit exceeds at least the predefined lower limit of restoration AC voltage value, the AC switch is restored on the basis of the restoration signal output from the restoration circuit.

4. The uninterruptible power supply apparatus according to claim 1, further comprising:

an input AC voltage detection unit which detects an input AC voltage that is input to said AC switch;

a load current measurement unit which measures the load current of said load device;

a load factor computation circuit which computes a load factor in accordance with the load current measured by said load current measurement unit; and a restoration circuit which generates a restoration signal when the AC voltage detected by said input AC voltage detection unit exceeds at least a lower-limit AC voltage setting that is determined in accordance with the load factor computed by said load factor computation circuit;

wherein said AC switch turns on to achieve restoration in accordance with the restoration signal generated by said restoration circuit.

5. The uninterruptible power supply apparatus according to claim 1, further comprising:

an input AC voltage detection unit which detects an input AC voltage that is input to said AC switch;

a load current measurement unit which measures the load current of said load device;

a load factor computation circuit which computes a load factor in accordance with the load current measured by said load current measurement unit; and a restoration circuit which generates a restoration signal when the AC voltage detected by said input AC voltage detection unit is between upper- and lower-limit AC voltage settings that are determined in accordance with the load factor computed by said load factor computation circuit;

wherein said AC switch turns on to achieve restoration in accordance with the restoration signal generated by said restoration circuit.

* * * * *